United States Patent
Xiao et al.

(10) Patent No.: US 8,230,220 B2
(45) Date of Patent: Jul. 24, 2012

(54) METHOD FOR REALIZING TRUSTED NETWORK MANAGEMENT

(75) Inventors: Yuelei Xiao, Shaanxi (CN); Jun Cao, Shaanxi (CN); Xiaolong Lai, Shaanxi (CN); Zhenhai Huang, Shaanxi (CN)

(73) Assignee: China Iwncomm Co., Ltd., Shaanxi (CN)

( * ) Notice: Subject to any disclaimer, the term of this patent is extended or adjusted under 35 U.S.C. 154(b) by 342 days.

(21) Appl. No.: 12/631,491

(22) Filed: Dec. 4, 2009

(65) Prior Publication Data

US 2010/0083349 A1    Apr. 1, 2010

Related U.S. Application Data

(63) Continuation of application No. PCT/CN2008/071698, filed on Jul. 21, 2008.

(30) Foreign Application Priority Data

Sep. 14, 2007    (CN) .......................... 2007 1 0018673

(51) Int. Cl.
*H04L 29/06* (2006.01)
(52) U.S. Cl. .......................................................... 713/169
(58) Field of Classification Search ................... 713/169
See application file for complete search history.

(56) References Cited

U.S. PATENT DOCUMENTS

| | | | | |
|---|---|---|---|---|
| 2003/0131088 | A1* | 7/2003 | Morrissey et al. | 709/223 |
| 2005/0091496 | A1* | 4/2005 | Hyser | 713/175 |
| 2005/0166051 | A1* | 7/2005 | Buer | 713/173 |
| 2005/0213768 | A1* | 9/2005 | Durham et al. | 380/278 |
| 2006/0150248 | A1* | 7/2006 | Ross et al. | 726/22 |
| 2006/0156398 | A1* | 7/2006 | Ross et al. | 726/22 |
| 2007/0043896 | A1* | 2/2007 | Daruwala et al. | 711/6 |

FOREIGN PATENT DOCUMENTS

| | | |
|---|---|---|
| CN | 1521990 A | 8/2004 |
| CN | 1744515 | 3/2006 |
| CN | 1744523 | 3/2006 |
| CN | 1901478 | 1/2007 |
| CN | 1983970 A | 6/2007 |

OTHER PUBLICATIONS

International Search Report of International Application No. PCT/CN2008/071698, dated Oct. 30, 2008.

* cited by examiner

*Primary Examiner* — Philip Chea
*Assistant Examiner* — Michael S McNally
(74) *Attorney, Agent, or Firm* — J.C. Patents

(57) ABSTRACT

A method for realizing trusted network management is provided. A trusted management agent resides on a managed host, and a trusted management system resides on a management host. The trusted management agent and the trusted management system are software modules, which are both based on a trusted computing platform and signed after being authenticated by a trusted third party of the trusted management agent and the trusted management system. Trusted platform modules of the managed host and the management host can perform integrity measurement, storage, and report for the trusted management agent and the trusted management system. Therefore, the managed host and the management host can ensure that the trusted management agent and the trusted management system are trustworthy. Then, the trusted management agent and the trusted management system execute a network management function, thus realizing the trusted network management. Therefore, the technical problem in the prior art that the network management security cannot be ensured due to the mutual attack between an agent, a host where the agent resides, and a manager system is solved, and trusted network management is realized.

5 Claims, 2 Drawing Sheets

METHOD FOR REALIZING TRUSTED NETWORK MANAGEMENT

CROSS-REFERENCE TO RELATED APPLICATIONS

This application is a continuation of International Application No. PCT/CN2008/071698, filed on Jul. 21, 2008, which claims the priority benefit of Chinese Patent Application No. 200710018673.X, filed on Sep. 14, 2007. The contents of the above identified applications are incorporated herein by reference in their entirety.

FIELD OF THE TECHNOLOGY

The present invention relates to the field of network security technology, and more particularly to a method for realizing trusted network management.

BACKGROUND

Network management is to plan, design, and control network resources and network equipment, so as to enable the network to maintain a high reliability and a maximum efficiency.

The network management concept has been gradually introduced with the development of the Internet. In early days, the Internet has fewer network access nodes, and has a simple structure, and most networks have flat structures. Thus, the management associated with fault detection and performance monitoring of the network is quite simple and easy. As the network technology has been continuously developed, the scale of the network is continuously expanded, the functional complexity is continuously enhanced, and the heterogeneous networks have been gradually merged, so that the network management becomes more and more difficult.

The conventional network management system generally adopts a centralized management model, in which the management function is concentrated on a manager at the management station, and the manager utilizes a simple network management protocol (SNMP) to communicate with an agent in equipment being managed to acquire management information for processing, and then sends a management operation instruction to implement the management on the equipment being managed. For example, the Internet Engineering Task Force (IETF) has proposed a SNMP-based manager/agent model in the year of 1988. Such a concentrated management model has the following defects.

1. The concentrated management model is mainly applicable to the management of data networks, and is merely applicable to a small-sized network with a simple structure or an application without frequently visiting the management information.

2. As the scale of the network is gradually expanded, and the number of users is continuously increased, the management of nodes has gradually become a bottleneck of the network management.

3. Too many polling operations are performed, widely-distributed agents require a large bandwidth overhead, and the management information obtained by the manager from each agent is raw data, so that the transmission of a great deal of raw data wastes the bandwidth and consumes valuable CPU resources of the manager, and as a result, the network management efficiency is rather low.

The network management system based on a common management information protocol (CMIP) is much more complicated than that based on the SNMP, which also adopts the centralized management mode and is mainly applicable to telecommunication network management.

Currently, network management has been gradually and rapidly developed towards the direction of distributed and intelligent distributed network management. The distributed network management is to divide a large-scale network management into several peer management sub-domains, one domain is managed by one manager, and managers are communicated with each other. When the information of other domain is required, the manager communicates with a corresponding peer system. As the distributed network management distributes the network management tasks and monitoring function to the whole network, without relying on a single control center, the network management traffic may be reduced, thus providing powerful management capability and extensibility.

The development trend of the distributed network management is mainly presented in the following two aspects. One aspect is to design an open, standard, and extensible large-scale distributed network management system by using a distributed computing tool under the current network management frame, which mainly includes a common object request broker architecture (CORBA)-based distributed network management system and a Web-based distributed network management system, and has the feature of being easily realized. The other aspect is a novel network management based on a distributed architecture, for example, a mobility-agent-based network management system.

However, the current centralized network management system and the distributed network management system both have the following security problems.

1. The host where the agent resides may attack the agent, and the current detection-based method cannot ensure the security of the agent.

2. The agent may attack the host where the agent resides, for example, the agent illegally visits private information of the host where the agent resides, and currently merely passive defense such as intrusion detection can be adopted to prevent such attack.

3. The network management user completely relies on the manager system, so that the security risk exits. If the manager system is controlled by a virus or Trojan horse, the manager system does not work according to the desire of the network management user, thereby losing the control and management on the network.

4. The managed host completely relies on the manger system, so that the security risk also exists. If the managed host does not detect whether the manager system is intruded by a virus or Trojan horse, once the agent residing on the managed host receives a malicious management command, the agent performs a malicious operation on the managed host.

SUMMARY

Accordingly, the present invention is directed to a method for realizing trusted network management, which is capable of solving the technical problem in the prior art that network management security cannot be ensured due to the mutual attack between an agent, a host where the agent resides, and a manager system.

The technical solution of the present invention is described as follows.

The present invention provides a method for realizing a trusted network management, which includes the following steps.

A trusted management agent residing on a managed host is installed and configured, and a trusted management system residing on a management host is installed and configured.

The managed host utilizes a trusted platform module (TPM) on the managed host to perform integrity measurement, storage, and report on the trusted management agent to verify a trustworthiness of the trusted management agent on the managed host; a network manager of the management host utilizes a TPM on the management host to perform integrity measurement, storage, and report on the trusted management system to verify a trustworthiness of the trusted management system on the management host.

The managed host and the management host are connected to a trusted network in a trusted network connect method, respectively.

When the managed host is connected to the trusted network, the trusted management agent on the managed host automatically sends information for querying the corresponding trusted management system; and after receiving the query information from the trusted management agent, the trusted management system actuates an authentication process between the trusted management system and the trusted management agent; then, the trusted management system and the trusted management agent perform mutual authentication and key agreement, so as to obtain a session key between the trusted management agent and the trusted management system.

After receiving the query information from the trusted management agent, the trusted management system on the management host notifies the management host to perform mutual user authentication and key agreement, and then the management host and the managed host perform the mutual user authentication and key agreement, so as to obtain a session key between the managed host and the management host.

The network manager of the management host utilizes the TPM on the managed host to perform integrity measurement, storage, and report on the trusted management agent to verify the trustworthiness of the trusted management agent on the managed host; and the managed host utilizes the TPM on the management host to perform integrity measurement, storage, and report on the trusted management system to verify the trustworthiness of the trusted management system on the management host.

When the managed host determines that the trusted management system executed on the management host and the trusted management agent executed on the managed host are both trustworthy by verification, the managed host permits the managed host and the management host to perform network management communication. When the network manager of the management host determines that the trusted management system executed on the management host and the trusted management agent executed on the managed host are both trustworthy by verification, the network manager of the management host starts executing network management.

Preferably, the trusted management agent and the trusted management system are both software modules based on a trusted computing platform and signed after being authenticated by a trusted third party of the trusted management agent and the trusted management system, and standard integrity measurements of the trusted management agent and the trusted management system are stored in a query network database after being signed by the trusted third party.

Preferably, the trusted management agent is a software module that is executed automatically as a system of the managed host is booted.

Preferably, the trusted network management refers to network management executed when the managed host and the management host determine that the trusted management agent and the trusted management system are both trustworthy.

Preferably, the network management may adopt a centralized network management, a distributed network management, or a network management mode of distributed control and centralized management, and the like.

Preferably, the network management mode of distributed control and centralized management may be realized in the following steps.

The network manager utilizes the session key between the trusted management system and the trusted management agent to send a security network management strategy to the trusted management agent on the managed host.

The trusted management agent performs monitoring and control on the managed host according to the security network management strategy, and performs control and management directly for mentoring data that can be determined according to the security network management strategy, and sends monitoring data to the trusted management system if the monitoring data that cannot be determined according to the security network management strategy.

After receiving the monitoring data, the trusted management system analyzes the monitoring data and sends an analysis result to the network manager, so that the network manager performs control and management on the managed host according to the analysis result, realizing trusted network management.

In the above embodiments of the present invention, by verifying the trustworthiness of the trusted management agent executed on the managed host, the managed host may actively defense an attacking motion performed by the trusted management agent on the managed host. Meanwhile, the managed host can ensure that the trusted management system on the management host performs management function thereof normally by verifying the trustworthiness of the trusted management system on the management host.

In addition, by verifying the trustworthiness of the trusted management agent on the managed host, the management host can prevent a malicious managed host to perform malicious attack on the trusted management agent residing on the managed host. Meanwhile, by verifying the trustworthiness of the trusted management system on the management host, the management host can ensure that the trusted management system executed on the management host is controllable, thereby ensuring that the trusted management system executes a management command of the network manager correctly.

In addition, the management host and the managed host are both based on the trusted computing platform, and perform network management after verifying that both the trusted management system and the trusted management agent are trustworthy, thereby realizing trusted network management.

Furthermore, the trusted management agent resides on each managed host to control the managed host, and the trusted management system resides on one management host to perform control and management on all the management hosts, thereby realizing the trusted network management of distributed control and centralized management.

DETAILED DESCRIPTION

In the present invention, a trusted management agent resides on a managed host, and a trusted management system resides on a management host. The trusted management agent and the trusted management system are both software modules based on a trusted computing platform and signed after being authenticated by a trusted third party of the trusted management agent and the trusted management system, and standard integrity measurements of the trusted management agent and the trusted management system are stored in a query network database after being signed by the trusted third party. A TPM on the managed host and a TPM on the management host may perform integrity measurement, storage, and report on the trusted management agent and the trusted management system, so that the managed host and the management host can ensure that the trusted management agent and the trusted management system are both trustworthy. The trusted management agent and the trusted management system perform a network management function, so as to realize trusted network management.

Figure 1:
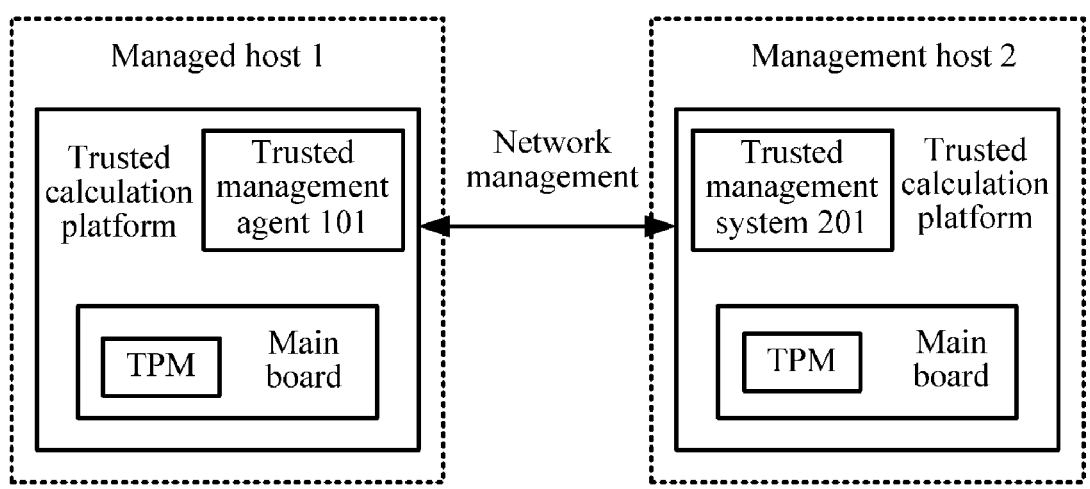
FIG. 1 is a schematic architectural view of the present invention.
Figure 2:
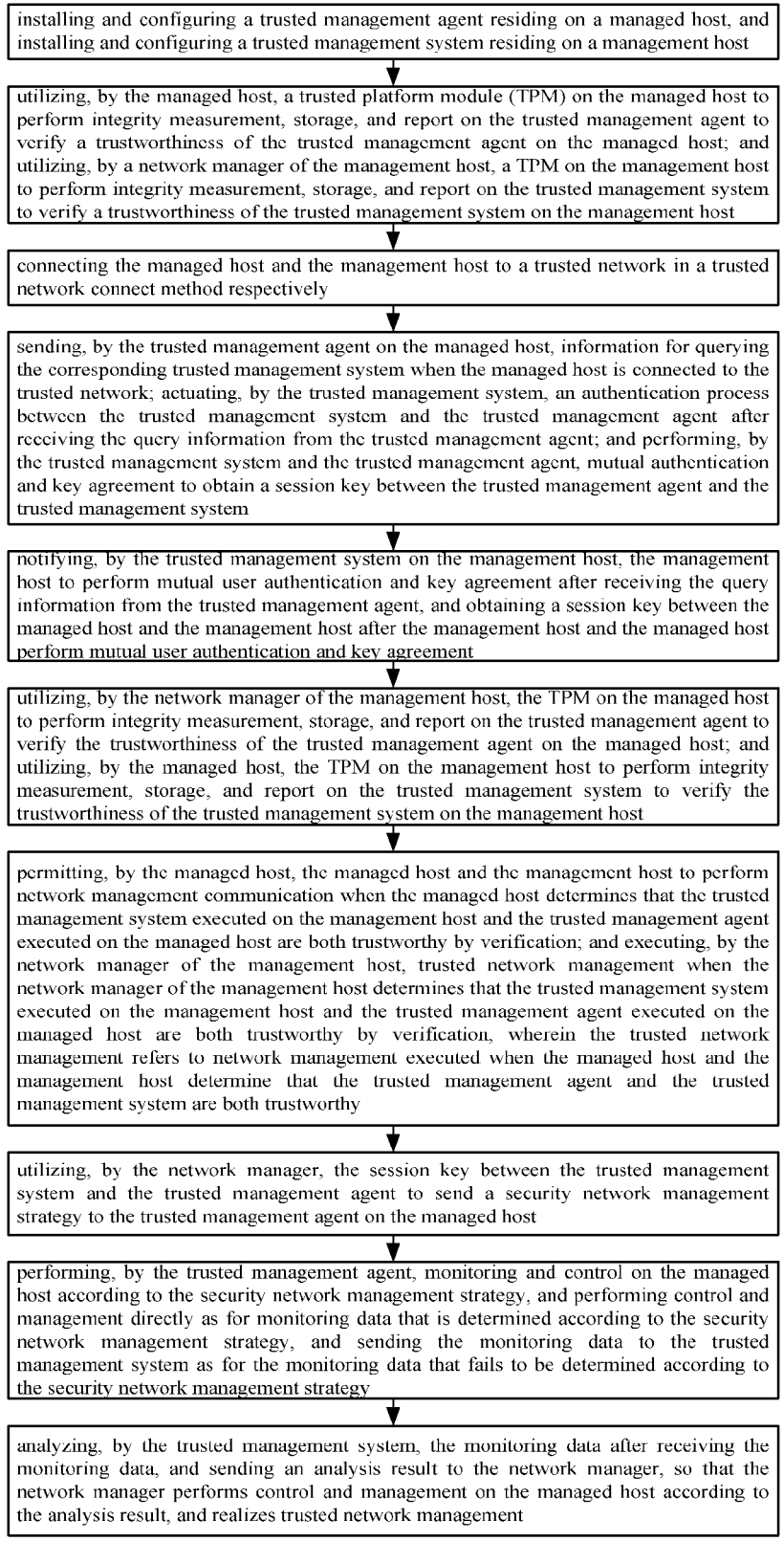
FIG. 2 illustrates an exemplary method of the present invention.

Referring to FIG. 1, the specific implementation of the embodiment of the present invention includes the following steps.

(i) A trusted management agent and a trusted management system are installed and configured.

A trusted management agent 101 residing on a managed host 1 is installed and configured, and a trusted management system 201 residing on a management host 2 is installed and configured. The installation and configuration of the trusted management system 201 is completed by a network manager. The installation and configuration of the trusted management agent 101 may be completed by the network manager or by a network user. When the network user completes installing and configuring the trusted management agent 101, configuration files are definitely distributed by the network manager, and the contents of the configuration files are unknown to the network user. In addition, the configuration of the trusted management agent 101 and the trusted management system 201 may be completed by a manufacturer in a manner of pre-installing. The trusted management agent 101 and the trusted management system 201 are both software modules based on a trusted computing platform and signed after being authenticated by a trusted third party of the trusted management agent 101 and the trusted management system 201, and standard integrity measurements of the two are stored in a query network database after being signed by the trusted third party.

(ii) A local trustworthiness of the trusted management agent and a local trustworthiness of the trusted management system are verified.

The managed host 1 utilizes a TPM to perform integrity measurement, storage, and report on the trusted management agent 101 to verify the trustworthiness of the trusted management agent 101 on the managed host 1, so as to actively defense an attacking operation of the trusted management agent 101 on the managed host 1.

The network manager of the management host 2 utilizes a TPM to perform integrity measurement, storage, and report on the trusted management system 201 to verify the trustworthiness of the trusted management system 201 on the management host 2, so as to ensure that the trusted management system 201 executed on the management host 2 is controllable, thereby ensuring that the trusted management system 201 executes a management command of the network manager correctly.

(iii) The managed host and the management host are connected to a trusted network in a trusted network connect method, respectively.

The trusted network connect method corresponds to a trusted network connection architecture. After a trusted network connection architecture is determined, a trusted network connect method corresponding to the trusted network connection architecture is determined.

(iv) The trusted management agent and the trusted management system perform mutual authentication and key agreement.

The trusted management agent 101 is a software module that is executed automatically as the system of the managed host 1 is booted. When the managed host 1 is connected to the trusted network, the trusted management agent 101 on the managed host 1 automatically sends information for querying the corresponding trusted management system 201. After receiving the query information from the trusted management agent 101, the trusted management system 201 actuates an authentication process between the trusted management system 201 and the trusted management agent 101. The trusted management system 201 and the trusted management agent 101 perform mutual authentication and key agreement by using configuration information pre-installed by the manufacturer, configuration information set by the network manager during installation or configuration files distributed by the network manager, so as to obtain a session key between the trusted management agent 101 and the trusted management system 201. The session key between the trusted management agent 101 and the trusted management system 201 is adapted to protect the secure communication between the trusted management system 201 and the trusted management agent 101.

(v) The managed host and the management host perform mutual user authentication and key agreement.

After the trusted management system 201 receives the query information from the trusted management agent 101, the trusted management system 201 on the management host 2 notifies the management host 2 to perform mutual user authentication and key agreement. After the management host 2 and the managed host 1 perform the mutual user authentication and key agreement, a session key between the managed host 1 and the management host 2 is obtained. The session key between the managed host 1 and the management host 2 is adapted to protect the transmission of data about remote integrity measurement between the trusted management agent 101 and the trusted management system 201.

(vi) A remote trustworthiness of the trusted management agent and a remote creditability of the trusted management system are verified.

Integrity measurement, storage, and report are performed on the trusted management agent 101 based on the TPM on the managed host 1, so as to verify the trustworthiness of the trusted management agent 101 on the managed host 1. Firstly, the management host 2 obtains remotely a platform configuration register (PCR) value and a measurement log corresponding to the trusted management agent 101 on the managed host 1, in which the PCR value corresponding to the trusted management agent 101 is AIK signed by the TPM on the managed host 1. Then, the management host 2 verifies validity of the PCR value and the measurement log corresponding to the trusted management agent 101, and verifies trustworthiness of the trusted management agent 101 on the managed host 1 according to the standard integrity measurement corresponding to the trusted management agent 101 in the query network database, thereby preventing a malicious managed host 1 from performing malicious attack on the trusted management agent 101 residing on the managed host 1.

Integrity measurement, storage, and report are performed on the trusted management system 201 based on the TPM on the management host 2, so as to verify the trustworthiness of the trusted management system 201 on the management host 2. Firstly, the managed host 1 obtains remotely a PCR value and a measurement log corresponding to the trusted management system 201 on the management host 2, in which the PCR value corresponding to the trusted management system 201 is AIK signed by the TPM on the management host 2. Then, the managed host 1 verifies validity of the PCR value and the measurement log corresponding to the trusted management system 201, and verifies the trustworthiness of the trusted management system 201 on the management host 2 according to the standard integrity measurement of the trusted management system 201 in the query network database, thereby ensuring that the trusted management system 201 on the management host 2 is controllable, and the trusted management system 201 executes a management command of the network manager normally.

(vii) Trusted network management is executed.

When the managed host 1 determines that the trusted management system 201 executed on the management host 2 and the trusted management agent 101 executed on the managed host 1 are both trustworthy by verification, the managed host 1 permits the managed host 1 to perform network management communication with the management host 2.

When the network manager of the management host 2 determines that the trusted management system 201 executed on the management host 2 and the trusted management agent 101 executed on the managed host 1 are both trustworthy by verification, the network manager of the management host 2 starts performing network management. Since the trusted management agent 101 and the trusted management system 201 are both trustworthy, the network management in this case is trusted network management.

It should be noted that, Step (ii) and Step (iii) in the present invention may be performed sequentially or in parallel, and the performing sequences thereof may be exchanged when they are performed sequentially. Step (iv) and Step (v) may also be performed sequentially or in parallel, and performing sequences thereof may be exchanged when they are performed sequentially.

The network management mode in the present invention may adopt a centralized network management, a distributed network management, network management of distributed control and centralized management, and the like.

For a large-scale network, it is recommended that the network management mode of distributed control and centralized management is adopted, and the specific implementation includes the following steps. A network manager utilizes a session key between the trusted management system 201 and the trusted management agent 101 to send a security network management strategy to the trusted management agent 101 on the managed host 1, and the trusted management agent 101 executes monitoring and control functions on the managed host 1 according to the security network management strategy. For monitoring data that can be determined according to the security network management strategy, the trusted management agent 101 performs control and management on the monitoring data directly. For monitoring data that cannot be determined according to the security network management strategy, the trusted management agent 101 needs to send the monitoring data to the trusted management system 201. After receiving the monitoring data, the trusted management system 201 analyzes the monitoring data, and then sends an analysis result to the network manager. The network manager performs control and management on the managed host 1 according to the analysis result, thereby eventually realizing trusted network management. Suspicious data refers to data that cannot be confirmed in certain monitoring results. The trusted management system 201 resides on one management host 2 to control and manage all the management hosts 2, thereby realizing the trusted network management of distributed control and centralized management.

The distributed control of the present invention mainly lies in that, each host has one trusted management agent, which performs monitoring and control according to a security network management strategy sent by a network manager through a trusted management system, and only for certain data that cannot be determined, the trusted management system is needed to perform control on the data.

The centralized management of the present invention mainly lies in that, only one host is installed with the trusted management system, which issues a security network management strategy and distributes the security network management strategy to each trusted management agent to execute the strategy, and only for the data that cannot be controlled and managed by the trusted management agent, the trusted management system is needed to perform control on the data, thereby realizing the centralized management.

In the above embodiment of the present invention, by verifying the trustworthiness of the trusted management agent executed on the managed host, the managed host may actively defense an attacking operation performed by the trusted management agent on the managed host. Meanwhile, by verifying the trustworthiness of the trusted management system on the management host, the managed host can ensure that the trusted management system on the management host perform the management function normally, thereby preventing the trusted management system from attacking the managed host.

In addition, by verifying the trustworthiness of the trusted management agent on the managed host, the management host can prevent a malicious managed host from performing malicious attack on the trusted management agent residing on the managed host. Meanwhile, by verifying the trustworthiness of the trusted management system on the management host, the management host can ensure that the trusted management system executed on the management host is controllable, thereby ensuring that the trusted management system executes a management command of the network manager correctly.

In addition, the management host and the managed host are both based on a trusted computing platform and perform network management when the trusted management system and the trusted management agent are verified to be trustworthy, thereby realizing the trusted network management.

In addition, the trusted management agent resides on each managed host to control the managed host, and the trusted management system resides on one management host to control and manage all the management hosts, thereby realizing the trusted network management of distributed control and centralized management.

The method for realizing trusted network management provided according to the present invention has been described above in detail. The principles and implementation manner of the present invention are described by citing specific examples, and the above embodiments are merely intended to facilitate the understanding of the solution of the present invention. Meanwhile, persons of ordinary skill in the art may make various modifications on the specific implementation manner and application scope of the present invention according to the ideas of the present invention, which are not construed as limitations of the present invention.

What is claimed is:

1. A method for realizing trusted network management, comprising:

installing and configuring a trusted management agent residing on a managed host, and installing and configuring a trusted management system residing on a management host;

utilizing, by the managed host, a trusted platform module (TPM) on the managed host to perform integrity measurement, storage, and report on the trusted management agent to verify a trustworthiness of the trusted management agent on the managed host; and utilizing, by a network manager of the management host, a TPM on the management host to perform integrity measurement, storage, and report on the trusted management system to verify a trustworthiness of the trusted management system on the management host;

connecting the managed host and the management host to a trusted network in a trusted network connect method respectively;

sending, by the trusted management agent on the managed host, information for querying the corresponding trusted management system when the managed host is connected to the trusted network; actuating, by the trusted management system, an authentication process between the trusted management system and the trusted management agent after receiving the query information from the trusted management agent; and performing, by the trusted management system and the trusted management agent, mutual authentication and key agreement to obtain a session key between the trusted management agent and the trusted management system;

notifying, by the trusted management system on the management host, the management host to perform mutual user authentication and key agreement after receiving the query information from the trusted management agent, and obtaining a session key between the managed host and the management host after the management host and the managed host perform mutual user authentication and key agreement;

utilizing, by the network manager of the management host, the TPM on the managed host to perform integrity measurement, storage, and report on the trusted management agent to verify the trustworthiness of the trusted management agent on the managed host; and utilizing, by the managed host, the TPM on the management host to perform integrity measurement, storage, and report on the trusted management system to verify the trustworthiness of the trusted management system on the management host; and permitting, by the managed host, the managed host and the management host to perform network management communication when the managed host determines that the trusted management system executed on the management host and the trusted management agent executed on the managed host are both trustworthy by verification; and executing, by the network manager of the management host, trusted network management when the network manager of the management host determines that the trusted management system executed on the management host and the trusted management agent executed on the managed host are both trustworthy by verification, wherein the trusted network management refers to network management executed when the managed host and the management host determine that the trusted management agent and the trusted management system are both trustworthy.

2. The method for realizing trusted network management according to claim 1, wherein the trusted management agent and the trusted management system are both software modules based on a trusted computing platform and signed after being authenticated by a trusted third party of the trusted management agent and the trusted management system, and standard integrity measurements of the trusted management agent and the trusted management system are stored in a query network database after being signed by the trusted third party.

3. The method for realizing trusted network management according to claim 1, wherein the trusted management agent is a software module that is executed automatically as a system of the managed host is booted.

4. The method for realizing trusted network management according to claim 1, wherein the network management comprises a centralized network management, a distributed network management, or a network management mode of distributed control and centralized management.

5. The method for realizing trusted network management according to claim 4, wherein the network management mode of distributed control and centralized management comprises:

utilizing, by the network manager, the session key between the trusted management system and the trusted management agent to send a security network management strategy to the trusted management agent on the managed host;

performing, by the trusted management agent, monitoring and control on the managed host according to the security network management strategy, and performing control and management directly as for monitoring data that is determined according to the security network management strategy, and sending the monitoring data to the trusted management system as for the monitoring data that fails to be determined according to the security network management strategy; and analyzing, by the trusted management system, the monitoring data after receiving the monitoring data, and sending an analysis result to the network manager, so that the network manager performs control and management on the managed host according to the analysis result, and realizes trusted network management.

* * * * *